No. 670,527. Patented Mar. 26, 1901.
C. G. BEECHEY.
ASSURANCE APPARATUS.
(Application filed May 18, 1900.)
(No Model.) 5 Sheets—Sheet 1.

No. 670,527. Patented Mar. 26, 1901.
C. G. BEECHEY.
ASSURANCE APPARATUS.
(Application filed May 18, 1900.)
(No Model.) 5 Sheets—Sheet 2.

No. 670,527. Patented Mar. 26, 1901.
C. G. BEECHEY.
ASSURANCE APPARATUS.
(Application filed May 18, 1900.)
(No Model.) 5 Sheets—Sheet 4.

WITNESSES:
Ella L. Giles
Otto Munk

INVENTOR
Charles Grantley Beechey
BY
Richardson
ATTORNEYS

No. 670,527. Patented Mar. 26, 1901.
C. G. BEECHEY.
ASSURANCE APPARATUS.
(Application filed May 18, 1900.)
(No Model.) 5 Sheets—Sheet 5.
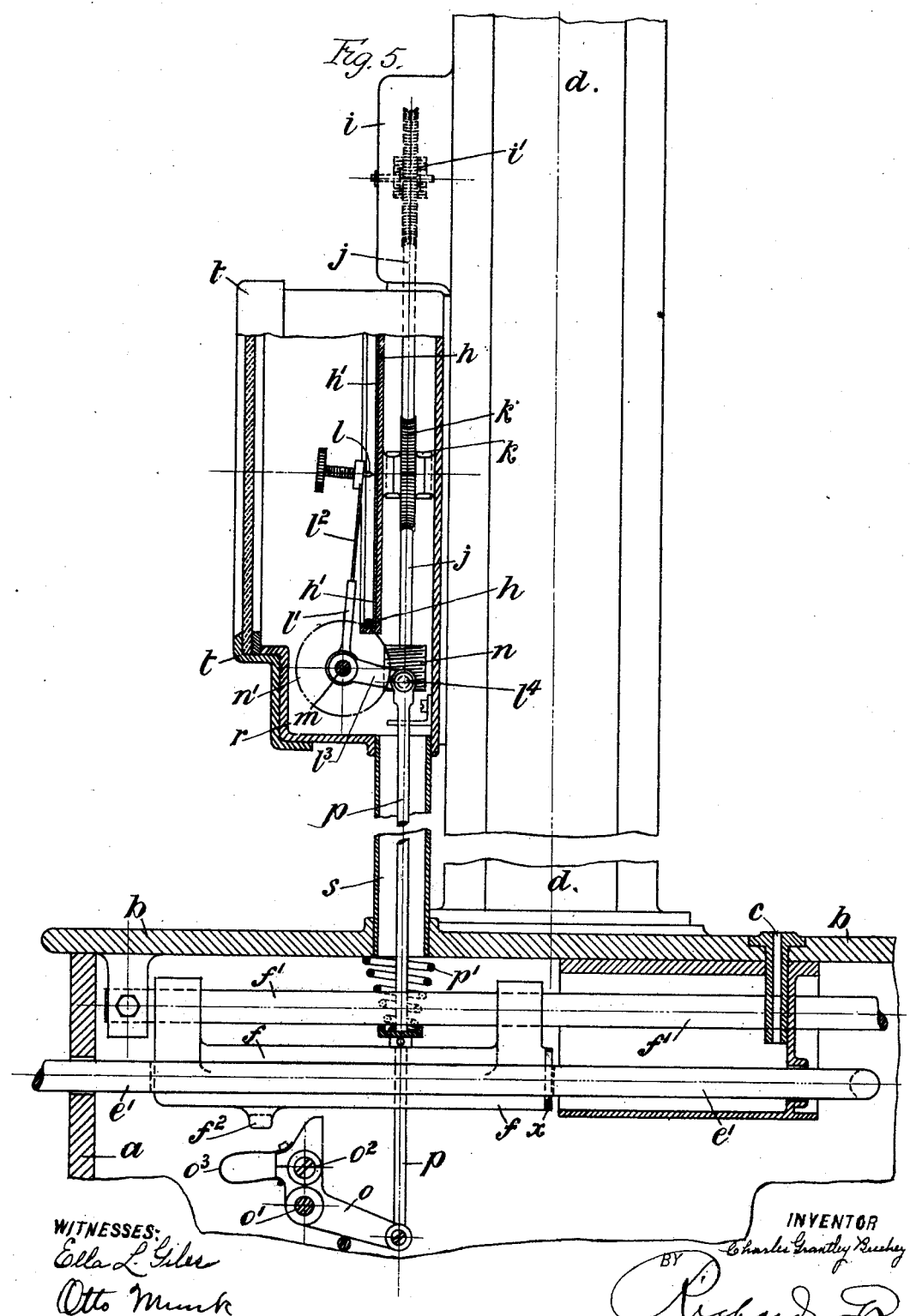
WITNESSES:
Ella L. Giles
Otto Munk
INVENTOR
Charles Grantley Beechey
BY
Richardson
ATTORNEYS

UNITED STATES PATENT OFFICE.

CHARLES GRANTLEY BEECHEY, OF LIVERPOOL, ENGLAND.

ASSURANCE APPARATUS.

SPECIFICATION forming part of Letters Patent No. 670,527, dated March 26, 1901.

Application filed May 18, 1900. Serial No. 17,169. (No model.)

*To all whom it may concern:*

Be it known that I, CHARLES GRANTLEY BEECHEY, a subject of the Queen of England, and a resident of Liverpool, in the county of Lancaster, England, have invented certain new and useful Improvements in Assurance Apparatus, of which the following is a specification.

This invention has reference to apparatus which has for its chief purpose, among others, to enable the public to furnish themselves with accident and other policies and the like mechanically, and thereby enable insurance companies to reach people employed in and about works, as well as others, directly and economically—that is to say, without personal attention—and so to extend their business and at the same time benefit the people; and the characteristic or the important characteristic of the present invention is to provide an efficient means in connection with such apparatus of affording evidence as to the issuance of any particular policy-ticket or transaction and also a means whereby the time at which the policy becomes issued is made evident and recorded. The invention has at the same time the object of accomplishing this with an apparatus and mechanism which is of small cost—*i. e.*, of a cheap order—besides being simple and convenient.

In describing the improvements or invention in question it will be assumed for convenience that the form of policies issued is that of tickets containing particulars and conditions of the policy and such matters pertaining to the transaction as may be necessary and useful to the purchaser and vender.

The invention will now be described with the aid of the accompanying drawings, in which the improvements are illustrated.

Figure 1:
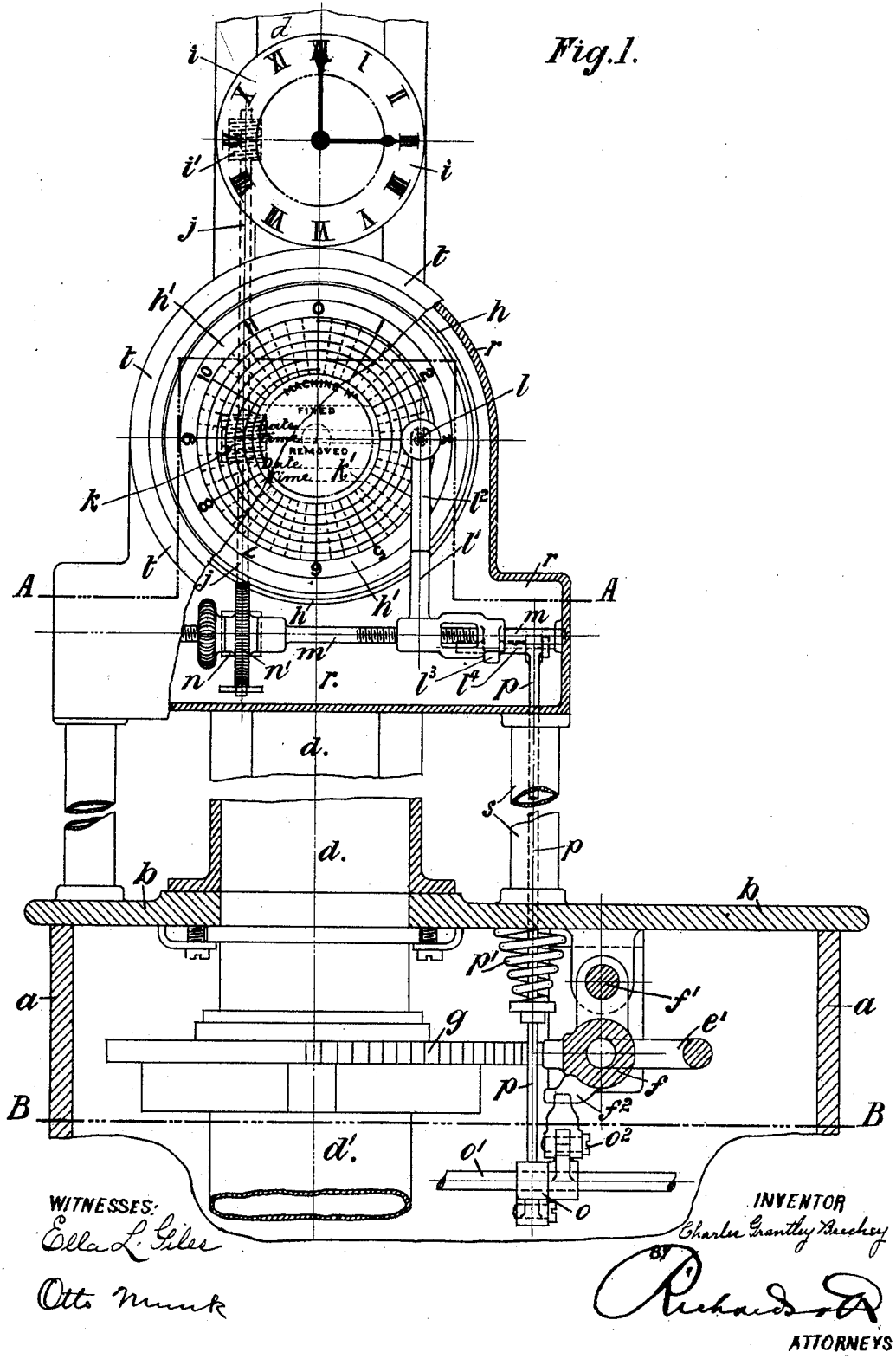
Figure 2:
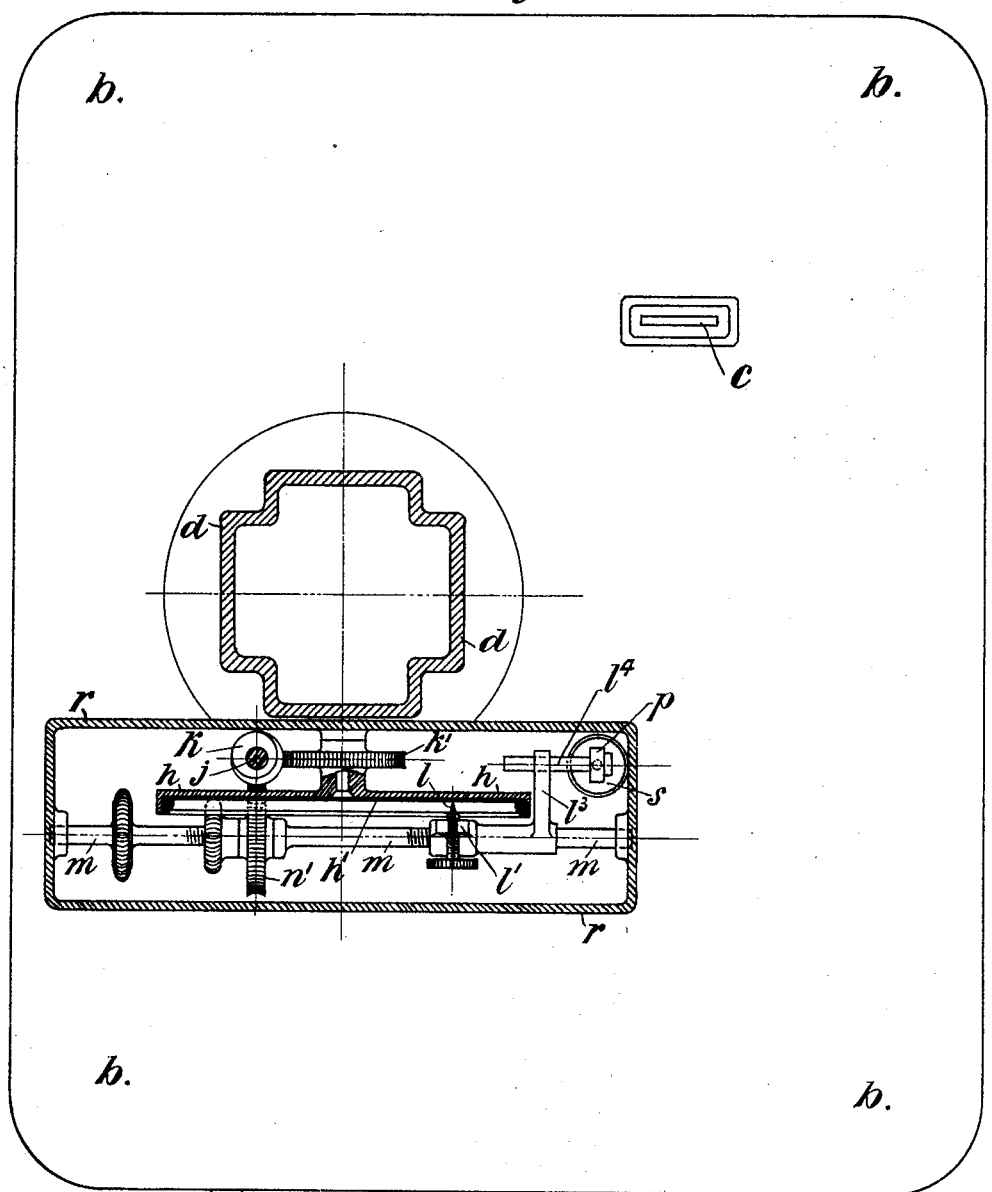
Figure 3:
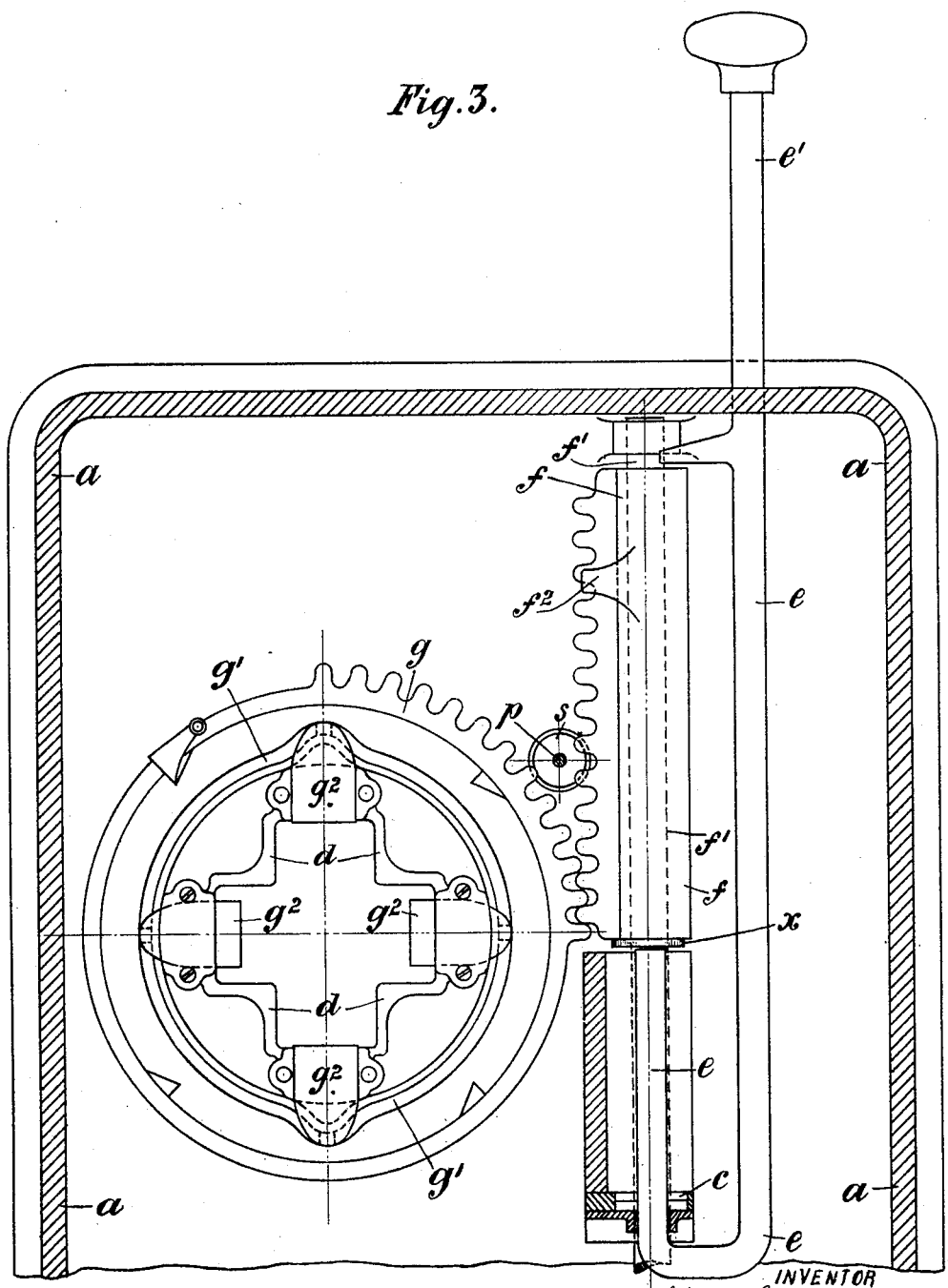
Figure 4:
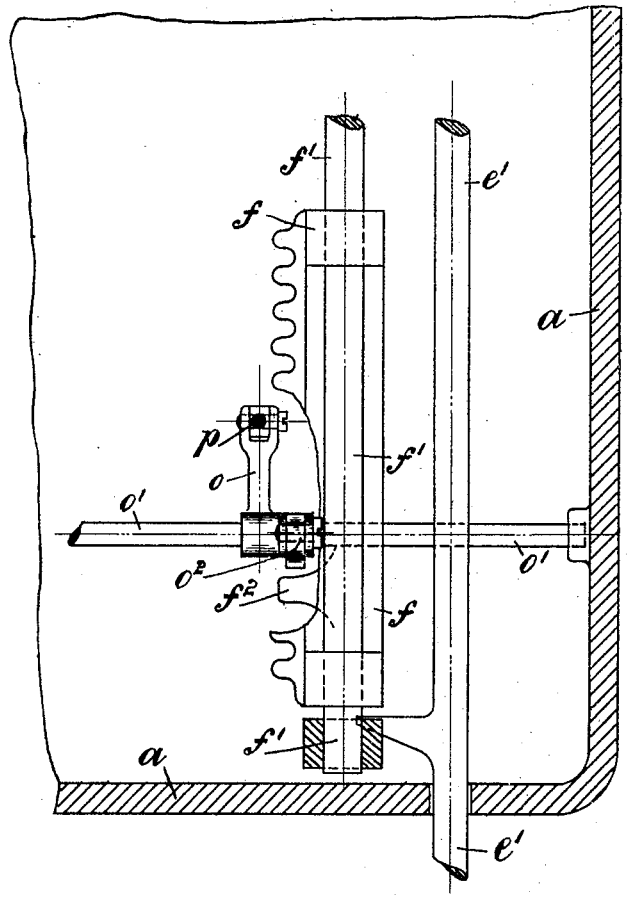

In the drawings, Figure 1 is a front elevation, partly in section, of apparatus, showing the improvement. Fig. 2 is a plan of the apparatus, taken at the line A A, Fig. 1. Fig. 3 is a plan taken at the line B B, Fig. 1, of the apparatus, viewed from below. Fig. 4 is a plan showing a detail of the apparatus; and Fig. 5 is a side elevation of the apparatus, partly in section.

Referring to the drawings, $a$ represents the case or body of the auto-insurance apparatus, and $b$ is the cover, on the upper surface of which there is a slot $c$ for the introduction of coin, constituting the insurance fee or payment, and the store-bin $d$ for containing the store of policy-tickets. Within the body $a$ is the mechanism for actuating the apparatus—namely, feeding or supplying policy-tickets through the intervention of the coin introduced into the coin-slot $c$. This mechanism comprises a puller-bar $e$, one end $e'$ of which extends through the casing $a$, a sliding toothed rack $f$, and a circular rack $g$, meshing with and operated by $f$ and operating in turn, through the cam-ring $g'$, the supporting and releasing bolts $g^2$, by which tickets are supported in the tube $d$ and are also released *seriatim* and delivered through a discharge-tube $d'$ into the tray $d^2$ on the outside of $a$, one ticket being delivered for each actuation of the bar $e$ on the insertion of the coin. All this mechanism is of known construction and does not in itself constitute any part of the present invention.

The improvements constituting the subject of the present invention will now be described.

In connection with the ticket-delivering apparatus described or in connection with any ticket-delivering apparatus of suitable type there is employed a mechanism for recording the time of each and every use of the apparatus taking place—that is to say, the time at which every ticket is issued by the apparatus—so that if the tickets be numbered when the apparatus is charged or inspected or the numbers of the tickets in the apparatus noted the time at which each ticket is discharged can be ascertained by the recording device. This mechanism consists of a moving disk or blank chart driven by a clock mechanism at a constant speed and a marker or marking device adapted also to be moved across the face of and to act on such chart through the actuating mechanism of the apparatus whenever said apparatus is used and actuated and so that, normally, when the apparatus is not being used the chart is not being marked and the clock mechanism has merely to revolve or move the diagram-chart constantly and shift the position of the marker transversely.

Referring to the drawings, $h$ is the disk, carrying the paper blank diagram $h'$ upon its face, this disk being driven from the clock $i$ above by a worm $i'$, meshing with a suitable worm-wheel on the clock train of wheels, a shaft $j$, on which the worm $i'$ is fixed, a second worm $k$ on the shaft $j$, and a worm-wheel $k'$ on the shaft of the disk $h$.

The marker consists of a pricker $l$, mounted on the end of the arm $l'$, having on it a spring-steel portion $l^2$. This arm is mounted on a shaft $m$, which is threaded at the part which passes through the arm-boss, and the interior of the boss is correspondingly threaded, and this shaft $m$ is revolved from the clock through the shaft $j$ and the worm $n$ on $j$ and the worm-wheel $n'$ on the shaft $n$. The effect of these movements is that while the disk $h$ is revolved past the marker $l$ the marker $l$ also is moved inwardly or outwardly—that is, laterally—over the paper chart disk or diagram $h'$. Consequently if the marker $l$ touched the paper $h'$ it would draw a spiral scroll, and if actuated—that is, pressed in periodically—it would produce punctures at intervals on the scroll-line. As shown by the drawings in Fig. 1, this scroll-line is marked on the diagram and the circle is divided into twelve divisions representing hour-divisions, the disk and diagram being adapted to make two revolutions in twenty-four hours. Consequently according to the number of complete revolutions of the scroll-lines drawn upon the chart so will be the number of days which a single chart can be used on the machine. By this it will be plain that the day, hour, and part of the hour at which each operation of the apparatus and puncture of the chart has taken place is recorded and indicated, and since the tickets are numbered the time at which any particular ticket is issued from the commencement can be ascertained.

The marker $l$ is actuated—that is, caused to move onto and puncture the diagram whenever the apparatus is used and to move back and stand off the surface of the chart whenever the apparatus is not in use—through the following means: On the rack $f$, which is carried by bosses at each end adapted to slide on the bar $f'$, there is provided the projecting part $f^2$, while below this a trigger in the form of a bell-crank lever $o$ is mounted on a shaft $o'$, and this trigger-arm $o$ is connected with the marker-arm $l'$ through an arm $l^3$, connected to the hub of the arm $l'$ by a rod $p$, which is normally pressed downward by a spring $p'$. When a coin (marked $x$ in Fig. 3) is introduced into the slot $c$ and the puller $e'$ is pulled out, the rack $f$ is moved in the same direction as the rod $e$ through the end of this rod and the coin $x$, and when the completion of this stroke is effected, or toward the end of it, the projection $f^2$ strikes the head of the lever $o$, and when it has moved this lever back, and consequently the marker $l$ off the face of the chart, and in its continued movement leaves the top of the lever, whereupon the spring $p'$ suddenly forces the lever back to its normal position, as shown in Fig. 5, and the momentum of the marker $l$ causes the point to be thrown onto the surface of the paper and puncture or mark it, and also directly afterward the spring $l^2$, carrying the marker, removes it from the chart. To allow of the longitudinal movement of the connected arms $l^3$ $l'$ and at the same time to provide the connection between the arm $l^3$ and the end of the rod $p$, the upper end of this rod fits over a pin $l^4$ on the end of the arm $l^3$. The return of the projection $f^2$ over the end of the arm $o$ is made possible by providing the upper end of the arm on a hinge $o^2$, adapted to enable the upper part to move forward when the projection $f^2$ strikes it at the back, but is otherwise rigid in the opposite direction when in the position shown in the drawings, and this position is normally retained by the bow-spring $o^3$.

All the recording mechanism is contained within a case $r$, fixed on the store-bin $d$, while the rod $p$ passes through the tube $s$, extending between the case $a$ and the case $r$. The space or front of the case $r$ is inclosed opposite the disk $h$ by a glazed door $t$.

What is claimed in respect of the herein-described invention is—

1. In automatic assurance apparatus, the combination with a policy-ticket-delivering mechanism, of a clock mechanism; a chart-disk revolved continuously by said clock; a marker for marking said chart, also moved continuously by said clock mechanism transversely across the plane of the chart; and a connection between said marker and the policy-ticket-delivering mechanism, whereby said marker is actuated when a ticket is delivered; substantially as set forth.

2. In automatic assurance apparatus, the combination of a policy-ticket-delivering mechanism, of a clock mechanism; a chart-disk revolved continuously by said clock; a marker for marking said chart, also moved continuously by said clock mechanism transversely across the plane of the chart, and adapted also to be moved up to and away from the plane of the shaft; and a connection between said marker and the policy-ticket-delivering mechanism, whereby said marker is actuated when a ticket is delivered; substantially as set forth.

3. In an automatic assurance apparatus the combination of a clock $i$; a vertical chart-holding disk $h$ revolved by said clock continuously; a marking-arm $l'$; and a shaft $m$ parallel with the plane of the disk $h$, and supporting said arm, and along which said arm is adapted to be moved by the clock; substantially as set forth.

4. In an automatic assurance apparatus, the combination of a clock $i$; a vertical chart-holding disk $h$ revolved by said clock continuously; a marking-arm $l'$; and a shaft $m$ parallel with the plane of the disk $h$, and supporting said arm, and along which said arm is adapted to be moved by the clock; a trigger $o$ adapted to be operated by the main actuating mechanism of the apparatus; and a connecting-rod $p$ connecting said arm $l'$ with the trigger; substantially as set forth.

5. In an automatic assurance apparatus, the combination of a clock $i$; a shaft $j$ driven by said clock; a vertically-disposed disk $h$ for carrying a recording-chart; gearing $k\ k'$ between said shaft and disk; marker-arm $l'$ carrying the marker; a shaft $m$ parallel with the disk $h$ carrying the arm $l'$, said shaft being threaded and meshing with the arm $l'$, also revolved from the shaft $j$; a gearing $n\ n'$ between the shafts $j$ and $m$; and an arm $l^3$, connected with and operated by the actuating mechanism of the apparatus, adapted to partially rotate the marker-arm $l'$ on its shaft $m$; substantially as set forth.

In witness whereof I have hereunto set my hand in presence of two witnesses.

CHARLES GRANTLEY BEECHEY.

Witnesses:
 JOHN HINDLEY WALKER,
 GEO. E. GODDING.